United States Patent [19]

Lehnert

[11] Patent Number: 5,203,746
[45] Date of Patent: Apr. 20, 1993

[54] TELESCOPING MAST ASSEMBLY

[75] Inventor: Heidi E. Lehnert, Doylestown, Ohio

[73] Assignee: The Will-Burt Company, Orrville, Ohio

[21] Appl. No.: 879,293

[22] Filed: May 7, 1992

Related U.S. Application Data

[62] Division of Ser. No. 717,895, Jun. 19, 1991.

[51] Int. Cl.[5] ............................................. F16G 1/24
[52] U.S. Cl. ................................... 474/206; 474/209
[58] Field of Search .............................. 474/206–212, 474/230, 232

[56] References Cited

U.S. PATENT DOCUMENTS

| | | | |
|---|---|---|---|
| 4,729,754 | 3/1988 | Thuerman | 474/209 X |
| 5,092,822 | 3/1992 | Wakabayashi | 474/209 |
| 5,107,672 | 4/1992 | Featherstone | 474/206 X |

Primary Examiner—Thuy M. Bui
Attorney, Agent, or Firm—Body, Vickers & Daniels

[57] ABSTRACT

Link-type chain assemblies are disclosed comprising alternating, laterally spaced pairs of inner and outer link plates having overlapping ends pivotally interconnected by rollers between the inner link plates at the overlapping ends. Mounting flanges extend axially outwardly from each of the inner and outer link plates, and plate members are mounted on the mounting plates to maintain the roller axes generally coplanar and to preclude pivotal displacement of adjacent pairs of inner and outer link plates about the roller axes in at least one direction. In one chain assembly, the plate members mounted on the mounting flanges span adjacent pairs of inner and outer link plates to preclude pivotal displacement of the spanned pair of link plates in opposite directions about the roller axis therebetween. In another chain assembly, individual plate members are mounted on the mounting flanges of adjacent ones of the inner and outer link plates and have adjacent planar surfaces which engage to preclude pivotal displacement of the adjacent pair of inner and outer link plates in just one direction.

20 Claims, 6 Drawing Sheets

TELESCOPING MAST ASSEMBLY

This is a division of application Ser. No. 717,895 filed Jun. 19, 1991.

BACKGROUND OF THE INVENTION

The present invention relates to the art of telescoping masts and, more particularly, to an improved interlocking or latching arrangement between driving and driven flexible link chains which provide a rigid drive assembly for extending and retracting the mast sections.

A telescoping mast and rigid drive assembly of the character to which the present invention relates is illustrated and described in detail in U.S. Pat. No. 5,102,375 assigned to the same assignee as the present application, and the subject matter of which patent is hereby incorporated by reference herein. Basically, the foregoing patent discloses a telescoping mast comprised of a plurality of nested mast sections adapted to be extended and retracted through a rigid drive assembly constructed of two flexible link-type chains, one of which is the driving element of the assembly and the other of which is a driven chain. The driving and driven chains have a common end connected to the innermost mast section, and the two chains are disposed adjacent one another within the mast sections and at right angles to one another with respect to the pivot axes of the links of the two chains. The two chains are fed from corresponding storage positions to a location at which they become parallel for movement together along a linear path generally coaxial with the mast sections and, at the point of linearity, the two flexible chains are latched together so as to provide a rigid drive assembly movable along the linear path to achieve extension and retraction of the mast sections.

In the foregoing patent, the latching arrangements are provided by driving plates secured, such as by welding, across the link plates of adjacent links of the driving chain so as to have abutting edges when the links are in a linear disposition, and alternate ones of the driving plates are provided with notches which are open toward the driven chain of the drive assembly. The link plates of the driven chain which face the driving chain are provided with protrusions secured thereto such as by welding, and extending toward the driving plates, and alternate ones of the protrusions are notched in the direction of movement of the drive assembly for interengagement with the notches in the driving plates when the two chains reach the point of linearity. The others of the protrusions on the links of the driven chain abut against the planar face of the driving plates when the two chains reach the point of linearity. The interengaging notches of the driving plates and protrusions rigidly interengage the two chains against separation laterally of the path of movement and against flexure of the two chains relative to their link axes. The interengagement further provides for the driving chain to displace the driven chain in opposite directions along the path of movement. The protrusions on the driven chain which abut against the drive plates add stability against flexure of the driving chain laterally of the path of movement.

While a latching arrangement of the foregoing character provides an adequate interconnection between the two flexible chains to provide a rigid drive for extending and retracting the sections of a telescoping mast, the notching of the protrusions extending from the driven chain imposes limitations on the load which can be displaced by the drive assembly and, thus, the load which can be utilized in connection with the mast. Furthermore, the welding of the notched drive plates to the driving chain link plates and/or the welding of the protrusions to the link plates of the driven chain is time consuming and expensive in connection with the manufacture of the two chain members. Even if the protrusions are integral with the driven chain link plates and the notched driving plates are integral with the link plates of the driving chain, the provision of such special link plate configurations together with the notching of the protrusions and drive plates is still an expensive procedure and does not overcome the load limitation imposed by the notches in the protrusions on the driven chain. Still further, if one of the notched protrusions or notched driving plates is damaged during use of the drive assembly, replacement thereof is time consuming and difficult and requires disassembly and replacement of at least one entire link section of either or both the driving and driven chains. Accordingly, an inventory of special link sections for both the chains must be maintained for repair and replacement purposes.

SUMMARY OF THE INVENTION

In accordance with the present invention, an improved link chain construction is provided and an improved latching arrangement is provided between the flexible driving and driven link chains to form a rigid interconnection therebetween and a rigid drive assembly having improved load capability and a reduced cost of construction and assembly of the driving and driven chain members. Furthermore, the latching arrangement according to the present invention advantageously provides for latching components on the driving and driven chains to be removed and replaced without disassembly of link sections of the chains and without requiring different link constructions for such replacement.

More particularly in accordance with the present invention, the driving and driven link chain members are provided with corresponding latch member attachments mounted on the link plates of the two chains, such as by rivets, which enable the individual latch members to be removed and replaced if necessary. Furthermore, the use of individual latch members enables the chain link plates to be of identical construction for both the driving and driven chain, whereby it is not necessary to maintain different basic link constructions for the driving and driven chain members. More particularly in this respect, the chain link plates of each of the driving and driven chain members can be provided with integral, outwardly extending flanges which are identical for both chains and to which the corresponding latch member is readily removably secured such as by riveting as mentioned above. Accordingly, only a single basic link structure is necessary to make repairs to both chains.

Preferably in accordance with the invention, the driven chain is provided with driven plate elements which extend into the space between the two chains and which are captured in the direction of the linear path of displacement of the drive assembly by a pair of latching members on the driving chain. Preferably, the driven plate is provided with an opening in the direction of the path of movement, and one of the driving members is provided with a finger which enters the opening and interengages therewith to optimize stability against displacement of the two chains laterally of the path of movement thereof. In any event, should it become necessary to remove and replace any of the latch components, it is only necessary to remove the rivet connection between the latter and the corresponding chain, and rivet a new latch member in place.

It is accordingly an outstanding object of the present invention to provide an improved linearly displaceable drive assembly comprised of two interlocked flexible link chain members.

Another object is the provision of a drive assembly of the foregoing character wherein the two link chain members are interlocked by a latching arrangement which provides improved load handling capability for the drive assembly provided by the interlocked chain members.

Yet another object is the provision of a drive assembly of the foregoing character wherein the driving and driven link chain members are selectively constructed from a basic link chain structure by mounting either driving or driven latch components thereto.

A further object is the provision of a drive assembly of the foregoing character wherein the driving and driven latch components are removably mounted on the corresponding driving or driven link chain member, thus facilitating removal and replacement thereof.

Still a further object is the provision of a drive assembly of the foregoing character wherein the driving and driven link chain members are structurally simple, economical to construct and maintain and efficient in use.

BRIEF DESCRIPTION OF THE DRAWINGS

The foregoing objects, and others, will in part be obvious and in part pointed out more fully hereinafter in conjunction with the written description of a preferred embodiment of the invention shown in the accompanying drawings in which.

DESCRIPTION OF A PREFERRED EMBODIMENT

Figure 1:
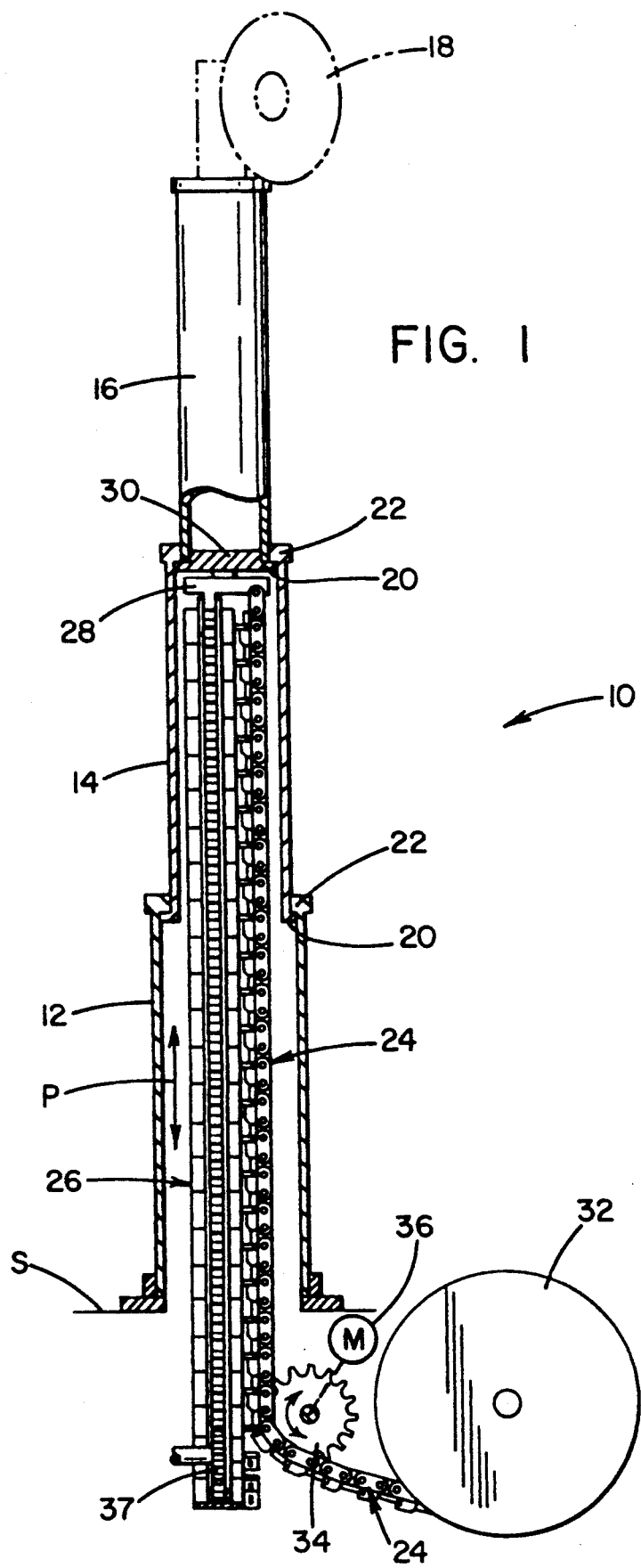
FIG. 1 is an elevation view, partially in section, showing a telescoping mast assembly incorporating a rigid drive assembly in accordance with the present invention.

Referring now to the drawings wherein the showings are for the purpose of illustrating a preferred embodiment of the invention only, and not for the purpose of limiting the invention, FIG. 1 illustrates a vertically extendable and retractable mast assembly 10 mounted on a suitable support S, such as a truck for example. Mast assembly 10 is comprised of a plurality of telescoping mast sections 12, 14 and 16, the lowermost section 12 being suitably secured to support S and the uppermost section 16 carrying an antenna or the like 18 which is to be elevated and lowered by the mast assembly. While mast assembly 10 is shown in FIG. 1 as being comprised of three sections, this is for purposes of simplicity, and it will be understood that the mast assembly can include more sections than illustrated. Mast sections 12, 14 and 16 are of tubular construction and have flanges 20 and 22 which interengage to limit relative displacement between the sections in the direction of extension of the mast assembly.

The mast sections, and thus antenna 18, are adapted to be elevated and lowered relative to support S along a vertical path P by a rigid drive assembly comprising a driving chain member 24 and a driven chain member 26 latchingly interengagable as described hereinafter. Each of the chain members 24 and 26 has an upper end connected to upper mast section 16 such as by a head member 28 to which the chain ends are secured and which in turn is secured to a plate member 30 mounted in the lower end of section 16. As will be described in greater detail hereinafter, the driving and driven chain members are each constructed from link plates spaced apart and interconnected by rollers providing axes about which adjacent link sections are pivotal and, when the chain members are latched together to provide a rigid, linear drive assembly within the mast sections, the axes of the two chains are in planes perpendicular to one another.

Prior to displacement of the two chains into latching interengagement to provide the rigid drive assembly along path P, the driving chain 24 is wound on a storage spool 32 having an axis parallel to the axes of the rollers of the driving chain, and driven chain 26 is wound on a storage spool, not shown, and which is rotatable about an axis parallel to the roller axes of the driven chain. Driving chain 24 is adapted to be displaced in opposite directions relative to storage spool 32 and path P by a drive sprocket 34 which is adapted to be rotated in opposite directions by a suitable drive motor 36. Driven chain 26 extends about an idler sprocket 37 between its storage spool and path P. When sprocket 34 is driven clockwise in FIG. 1, driving chain 24 is displaced from spool 32 toward driven chain 26 and path P. As the link sections of the driving chain move about the axis of sprocket wheel 34 they merge into parallel relationship with the link sections of driven chain 26 moving about the axis of sprocket wheel 37, and the two chains are latchingly interengaged as described hereinafter. Accordingly, driven chain 26 is displaced from its storage spool and upwardly by and together with driving chain 24, and the interengaged chains provide the rigid drive assembly by which the mast sections are displaced toward the extended positions thereof by such upward displacement of the two chains. Upon reversing the drive of motor 36, the link sections of driving chain 24 move out of latching interengagement with driven chain 26 in the area adjacent sprocket wheels 34 and 37 and the driving chain is fed onto spool 32. Downward displacement of driving chain 24 imparts downward displacement to driven chain 26 whereby, upon unlatching, the driven chain is displaced into its storage area.

Referring now to FIGS. 2-8 of the drawing, it will be seen that each of the driving and driven chain members 24 and 26 is of the same basic construction with respect to the link plates and rollers thereof. More particularly in this respect, each of the driving and driven chains is constructed from alternating pairs of parallel inner link plates 38 and parallel outer link plates 40 which are laterally and pivotally interconnected at their overlapping ends by rollers 42 and corresponding roller pins 44 which extend through the rollers and through pin openings in the link plates. Further, as will be appreciated from FIGS. 6 and 7, inner link plates 38 have opposite edges 38a and 38b between the ends thereof and outer link plates 40 have opposite edges 40a and 40b between the ends thereof. Each inner link plate 38 of the driving and driven chain members includes a flange 46 extending axially outwardly from edge 38a thereof and provided with an opening 48 therethrough. Similarly, each of the outer link plates 40 of the driving and driven chain members includes a flange 50 extending axially outwardly from edge 40a thereof and having an opening 52 therethrough. Preferably, flanges 46 and 48 are integral with the corresponding link plate, although the flanges could be separate therefrom and suitably secured thereto such as by welding. This basic structure for the driving and driven chains advantageously enables a single chain construction to be used interchangeably as the driving or driven chain member, the only difference between the driving and driven chain members being the components mounted thereon to achieve driving of the driven chain member and latching interengagement between the driving and driven chain members for the latter to provide a rigid drive assembly for the telescoping mast.

As best seen in FIGS. 2, 4, 5 and 8, driving chain 24 is provided with alternating first and second driving and latching members 54 and 56, respectively, mounted on adjacent link sections of the driving chain member. Each of the first driving and latching members 54 is in the form of a plate and includes a body portion 58 and planar mounting flanges 60 extending therefrom and overlying flanges 50 of outer link plates 40 of each of the link sections defined by the latter link plates. Each of the first driving and latching members is secured to the corresponding pair of flanges 50 by rivets 62 which facilitate assembly of the chain as well as replacement of member 54 if it becomes necessary to do so. Body portions 58 extend into the space between the driving and driven chain members and, with respect to the vertical orientation of the driving and driven chain members when latchingly interengaged, the flanges 60 of each of the first driving and latching members 54 have upper and lower linear edge surfaces 64 and 66, respectively. The upper end of body portion 58 is provided with a recess 68 defined at its outer end by an upstanding latching finger 70 which serves the purpose set forth hereinafter.

Figure 5:
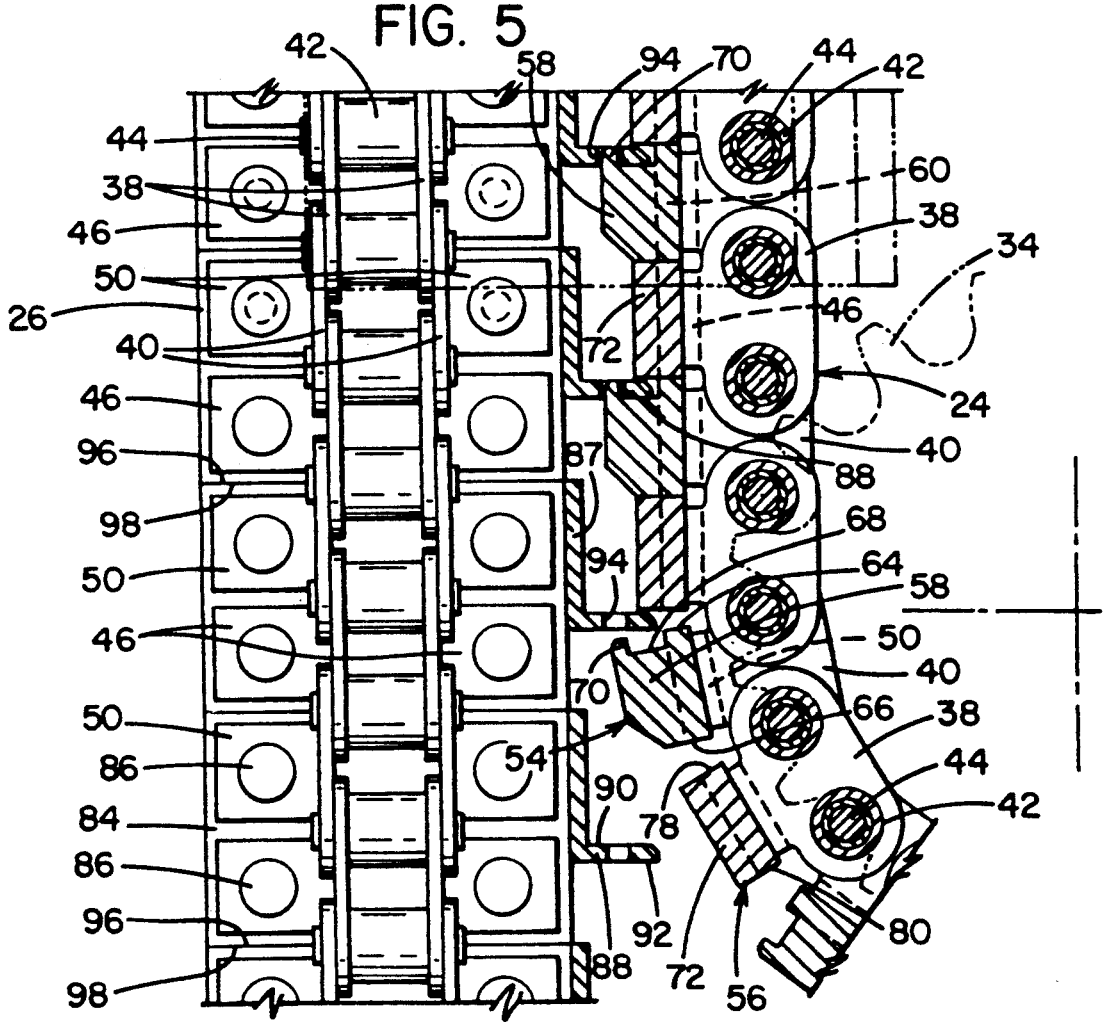
FIG. 5 is a cross-sectional elevation view of the latched chain members taken along line 5—5 in FIG. 4.
Figure 6:
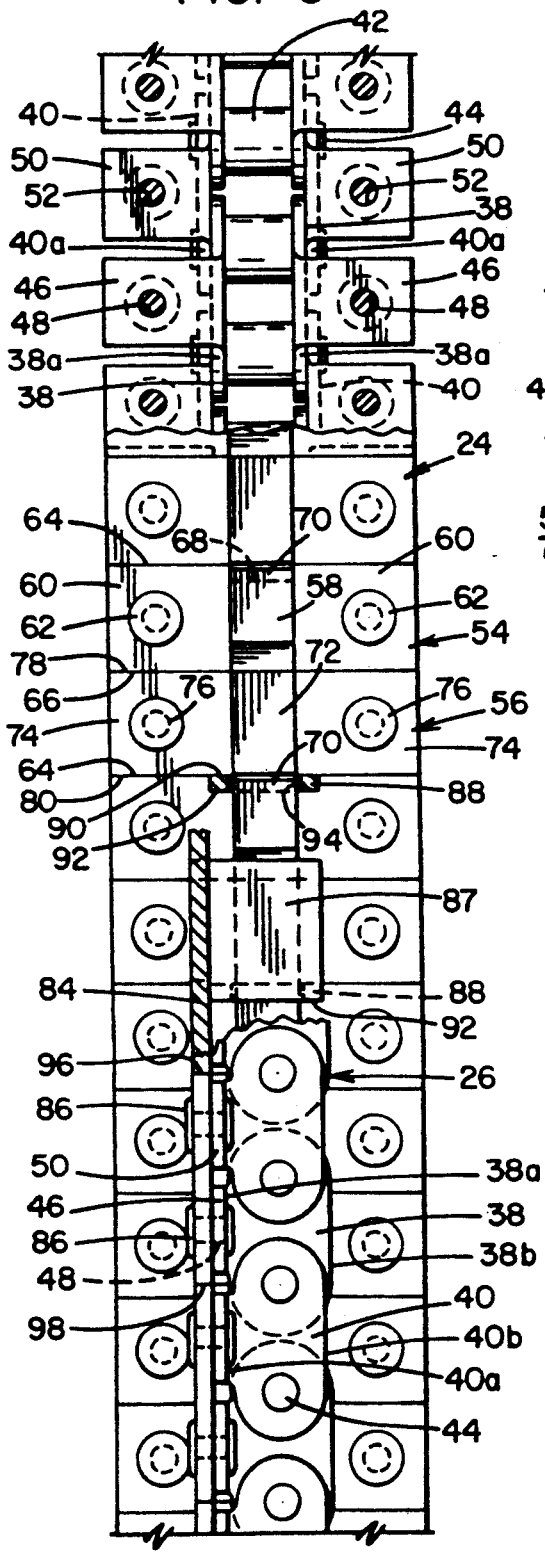
FIG. 6 is an elevation view partly in section of the latched chain members as seen in the direction of line 6—6 in FIG. 4.
Figure 7:
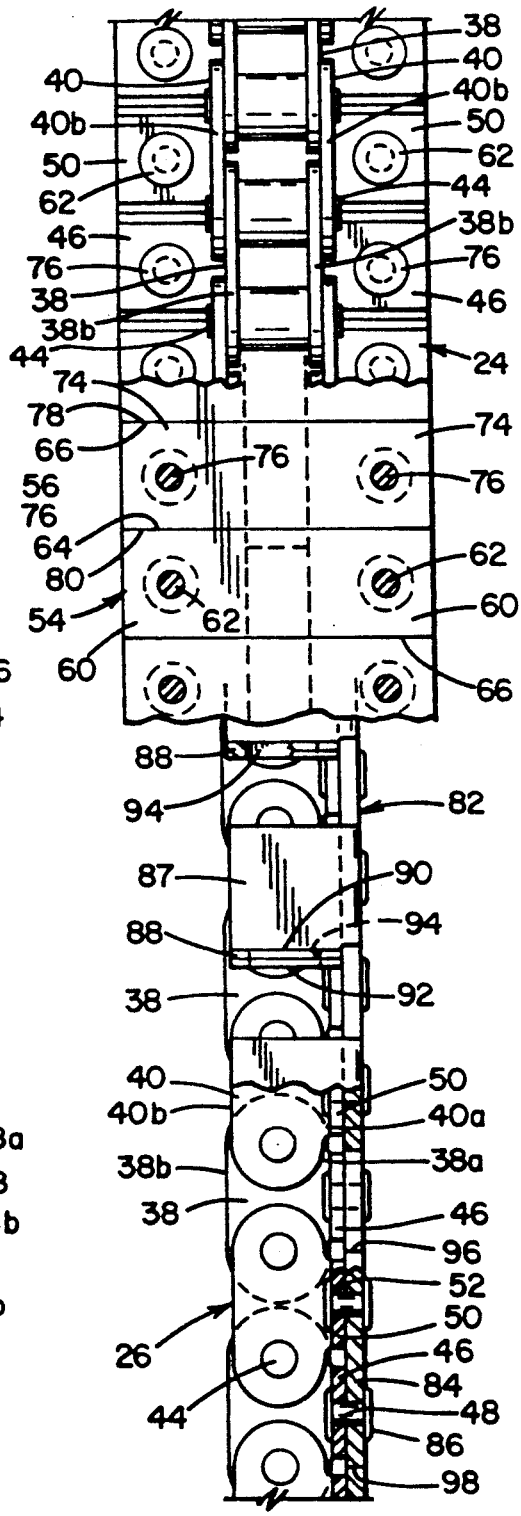
FIG. 7 is an elevation view partly in section of the latched chain members as seen in the direction of line 7—7 in FIG. 4; and, FIG. 8 is a perspective view of a portion of the latched driving and driven chain members.
Figure 8:
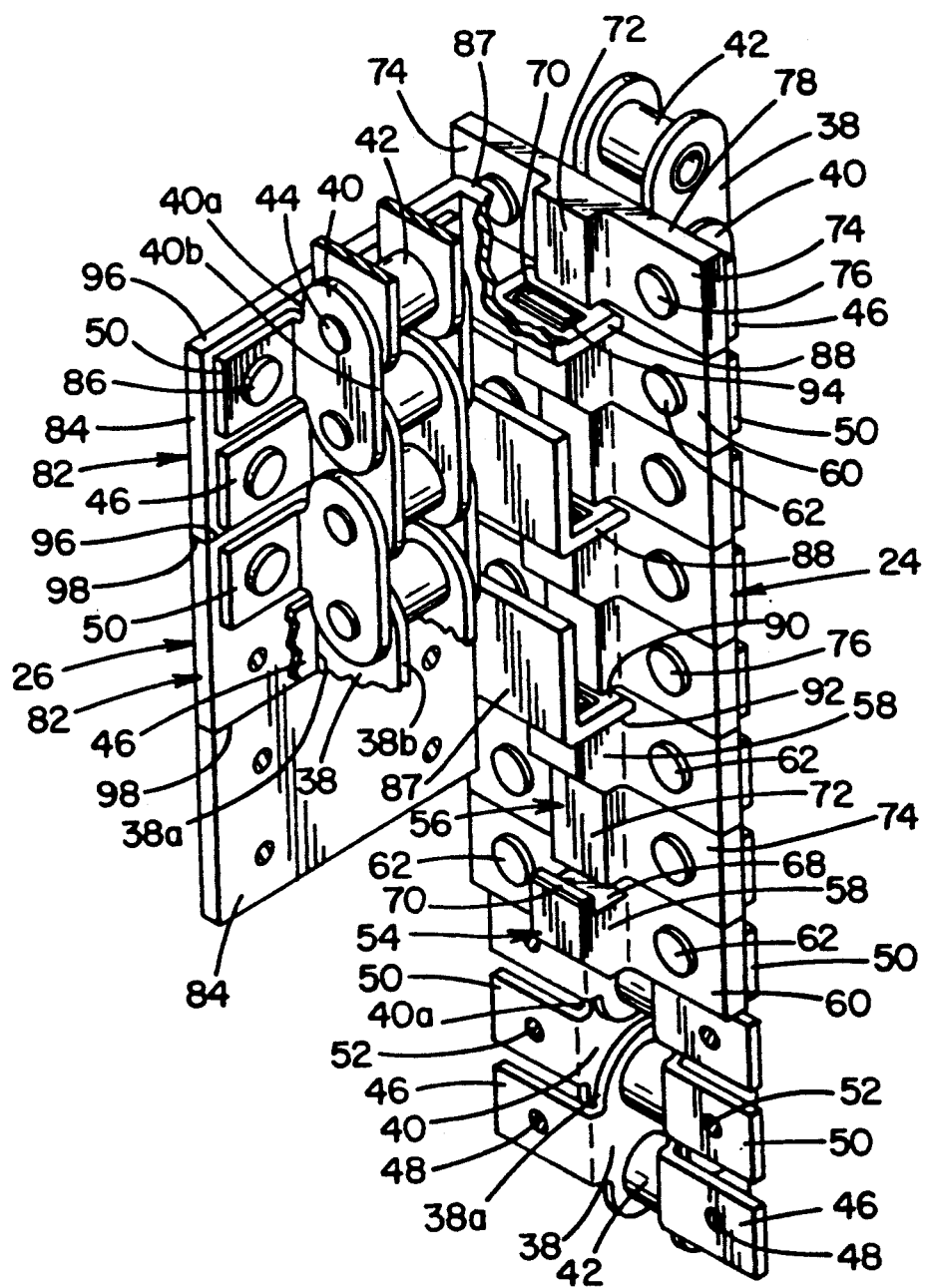

Each of the second driving and latching members 56 is in the form of a plate and includes a body portion 72 and planar mounting flanges 74 extending outwardly therefrom and overlying flanges 46 of inner link plates 38 of the corresponding chain section defined by the inner link plates. As with members 54, each of the second driving and latching members 56 is secured to the corresponding link flanges 46 by rivets 76. Flanges 74 of each second driving and latching member 56 have upper and lower linear edge surfaces 78 and 80, respectively. When the driving and driven chains are latchingly interengaged, upper surface 78 abuts against lower surface 66 of the upwardly adjacent first driving and latching member 54, and lower surface 80 abuts against upper surface 64 of the first driving and latching member 54 therebeneath. Further, as best seen in FIG. 5, the lower end of body portion 72 is coplanar with lower surface 80 and extends across the inner end of recess 68 in the first driving and latching member therebeneath for the purpose set forth more fully hereinafter. As will be appreciated from FIG. 6, the body portions 58 and 72 of the driving and latching members 54 and 56 have a width generally corresponding to the lateral spacing between inner link plates 38 of the chain.

As best seen in FIGS. 2, 4, 5 and 8, driven chain member 26 is provided with a plurality of driven plate members 82, each of which is comprised of a mounting plate portion 84 overlying flanges 46 and 50 of adjacent inner and outer link plates 38 and 40 of the driven chain member. Each driven plate member 82 is preferably secured to both the corresponding flanges 46 and 50 of adjacent chain links by rivets 86 extending through openings therefor in the mounting plate portion and openings 48 and 52 in the link flanges. However, the mounting plate portion 84 can be secured to just flanges 46 or just flanges 50 in which case the mounting plate portion is displaceable relative to one pair of the flanges to permit pivotal movement between the adjacent links which is otherwise precluded. Again, the use of rivets facilitates construction of the chain as well as maintenance thereof. Each driven plate member 82 further includes an L-shaped driven flange including a first leg 87 integral with and extending perpendicularly from the edge of mounting plate portion 84 facing driving chain 24, and a second leg 88 perpendicular to leg 87 and extending therefrom into the space between the two chains. Flange leg 88 has upper and lower surfaces 90 and 92, respectively, perpendicular to the path of movement of the drive assembly, and the latter flange leg is provided with an opening 94 between the upper and lower surfaces. Opening 94 receives finger 70 of a first driving and latching member 54 on driving chain 24 when the driving and driven chains are latchingly interengaged and has length and width dimensions closely corresponding to the length and width of finger 70. Mounting plate portion 84 of each driven plate member 82 has upper and lower linear edge surfaces 96 and 98, respectively, and when the two chain members are latchingly interengaged, adjacent ones of the edges 96 and 98 are in abutting engagement.

The thickness of flange leg 88 between surfaces 90 and 92 corresponds to the depth of recess 68 in the first driving and latching member, and the leg 88 extends toward driving chain 24 in the recess to the extent that the outer end of the flange leg underlies the lower end of body portion 72 of the adjacent second driving and latching member 56 on the driving chain member. Thus, when the two chains are interengaged, leg 88 of the driven flange is laterally captured in recess 68 by the interengagement between finger 70 and opening 94 and is vertically captured between the bottom of recess 68 and the lower end of body portion 72 of the upwardly adjacent second driving and latching member. Accordingly, it will be appreciated that when driving chain 24 is displaced upwardly, driven chain 26 is driven upwardly by the driving chain through the interengagement of flange legs 88 with the first driving and clamping members and that, during driving displacement of chain 24 downwardly, the driven chain member 26 is driven downwardly by interengagement of flange legs 88 with the lower ends of body portions 72 of the second driving and latching members 56. Moreover, during both such displacements of the driving and driven chain members, the driving and driven latching members interengage to preclude relative lateral displacement between the two chain members in a plane transverse to the path of movement and thus provide a rigid drive assembly by which the telescoping mast can be extended and retracted. Rigidity of the assembly is further promoted by the abutting engagement between adjacent members 54 and 56 on chain 24 and adjacent members 82 on chain 26.

Figure 2:
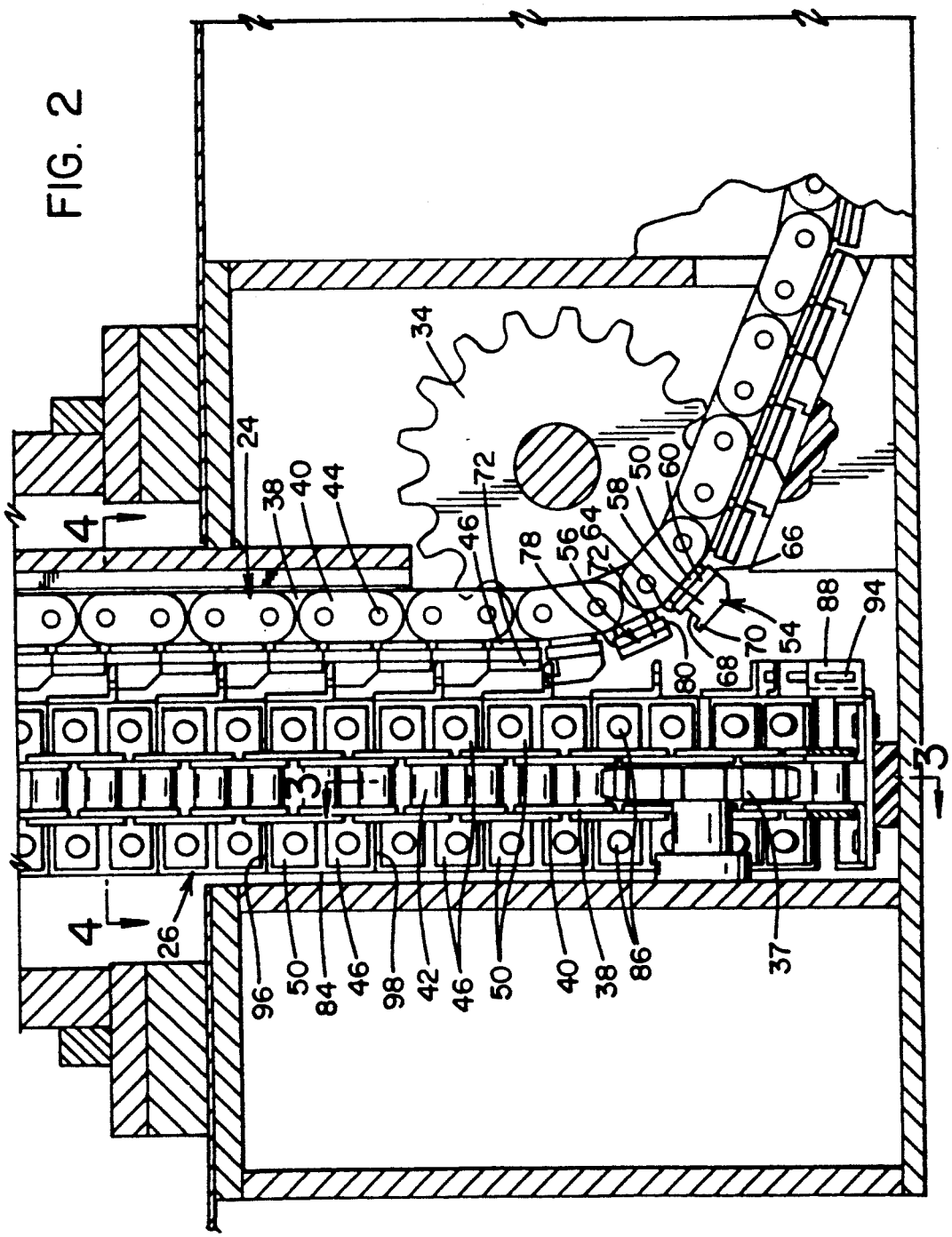
FIG. 2 is an enlarged elevation view in section showing a portion of the driving and driven chain members in latched and unlatched relationship.
Figure 3:
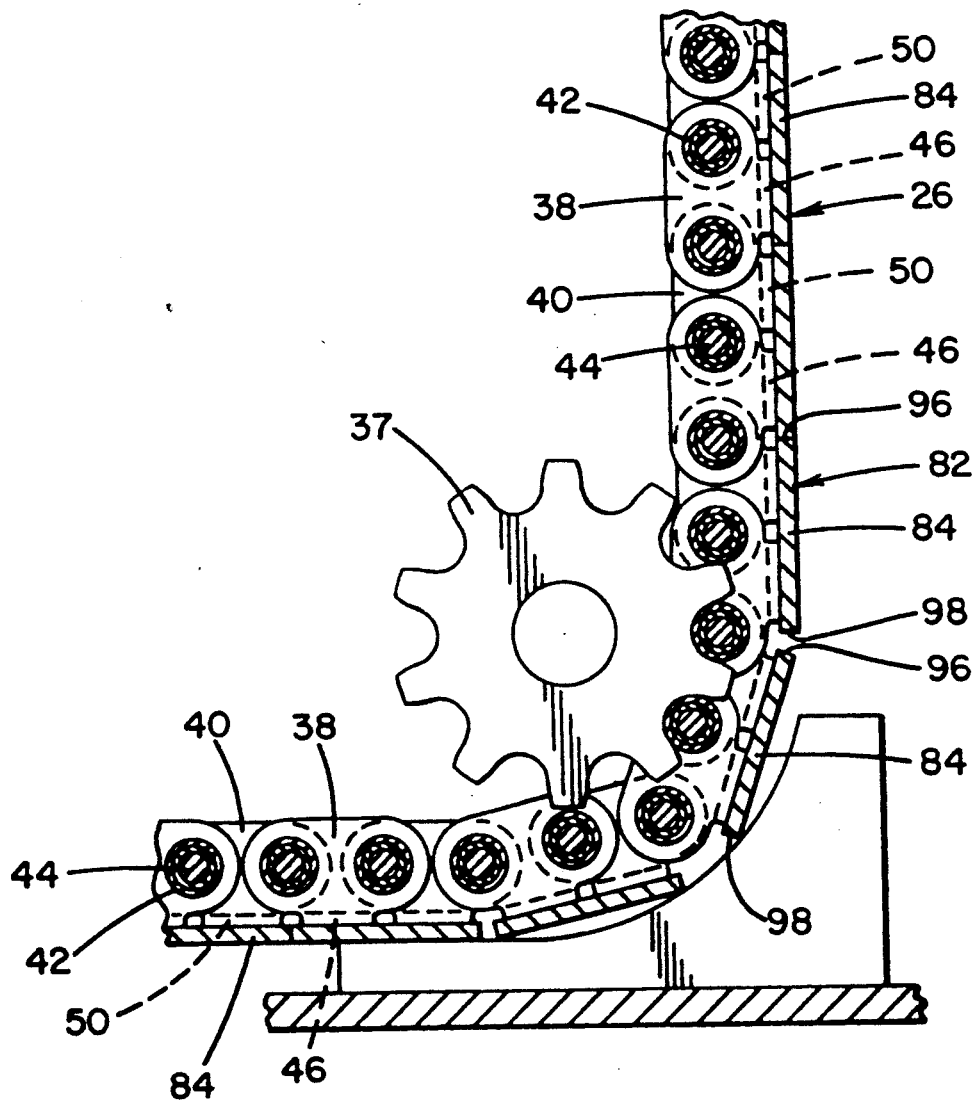
FIG. 3 is an enlarged sectional elevation view of the driven chain member taken along line 3—3 in FIG. 2.
Figure 4:
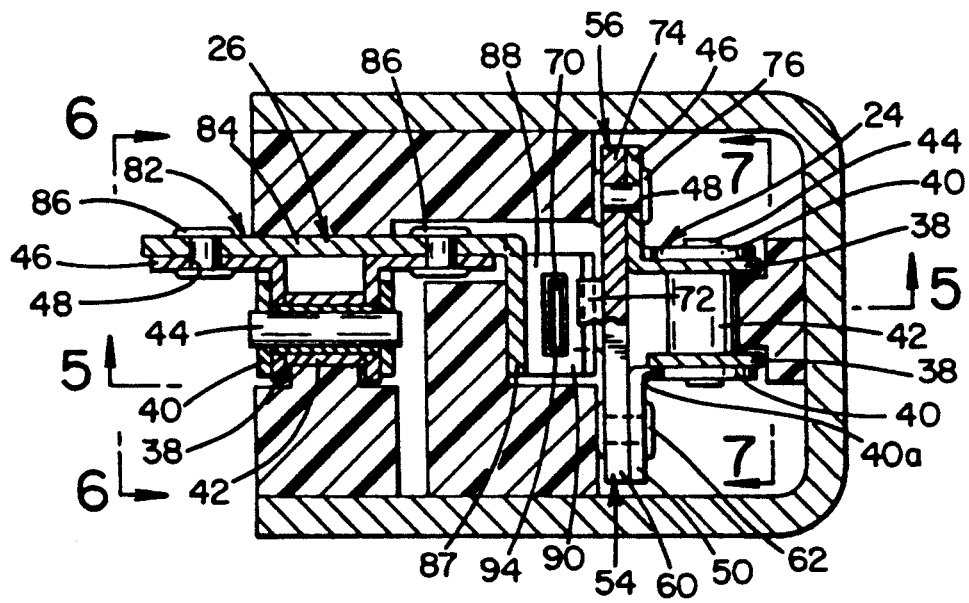
FIG. 4 is a cross-sectional view of the latched chain members taken along line 4—4 in FIG. 2.

It will be appreciated from FIGS. 2 AND 5 that the first and second driving and latching members on the driving chain member are oriented relative to a corresponding driven plate member on the driven chain member to provide for latching interengagement therebetween to take place smoothly as the link sections of the two chain members move from their storage positions about the corresponding sprocket wheel and make the transition to the vertical orientations thereof. More particularly in this respect, as the first driving and latching members 54 move about the axis of sprocket wheel 34 in the direction to drive the driving and driven chain members upwardly, finger 70 of a driving and clamping member and the adjacent recess 68 in the upper surface thereof progressively move into interengaging relationship with opening 94 and the lower surface 92 of flange leg 88 of a driven plate member 82. This transition of the driving and driven chain members from detached to latched relationship further provides for the upper surface 90 of driven flange leg 88 to engage the lower end of body portion 72 of the second driving and latching member 56 immediately ahead of the first latching member 54 with respect to the upward direction of movement of the driving and driven chain members.

While considerable emphasis has been placed herein on a specific embodiment of the invention, it will be appreciated that other embodiment as well as modifications of the embodiment disclosed will be suggested or apparent and can be made without departing from the principles of the invention. Accordingly, it is to be distinctly understood that the foregoing descriptive matter is to be interpreted merely as illustrative of the present invention and not as a limitation.

Having thus described the invention, it is claimed:

1. A chain assembly comprising a plurality of inner and outer link plates, each said inner and outer link plate having opposite ends and spaced apart opposite edges between said ends, said inner and outer link plates being in alternating laterally spaced pairs with the ends of adjacent pairs of inner and outer link plates overlapping and pivotally interconnected by roller means laterally between said inner link plates at said overlapping ends, said roller means providing roller axes transverse to said inner and outer link plates about which adjacent pairs of said inner and outer link plates are pivotal in opposite directions, said inner and outer link plates each having a mounting flange on a corresponding one of said opposite edges and extending axially outwardly from said one edge with respect to said roller axes, and means mounted on said mounting flanges of adjacent pairs of said inner and outer link plates to maintain said roller axes generally coplanar and preclude pivotal displacement of said adjacent pairs of inner and outer link plates about said roller axes in at least one of said opposite directions.

2. A chain assembly according to claim 1, wherein said means mounted on said flanges is removably attached thereto.

3. A chain assembly according to claim 1, wherein said means mounted on said flanges include plate means having spaced apart opposite end edges parallel to said roller axes, the adjacent end edges of adjacent ones of said plate means engaging one another to preclude pivotal displacement of said adjacent pairs of inner and outer link plates in said at least one direction.

4. A chain assembly according to claim 3, wherein each said plate means spans one adjacent pair of inner and outer link plates and precludes pivotal displacement of said one pair of link plates about the roller axis therebetween in both said opposite directions.

5. A chain assembly according to claim 4, wherein each said plate means has spaced apart opposite side edges between said end edges, and flange means extending from corresponding ones of said side edges and having a first flange portion transverse to said roller axes and a second flange portion extending from said first portion generally parallel to said roller axes.

6. A chain assembly according to claim 5, wherein said second flange portion extends axially outwardly from said first flange portion in a plane perpendicular to the planes of said inner and outer link plates.

7. A chain assembly according to claim 6, wherein said first and second flange portions are integral with one another and with said plate means.

8. A chain assembly according to claim 7, and an opening through said second flange portion perpendicular to the plane thereof.

9. A chain assembly according to claim 8, wherein said plate means is removably mounted on said mounting flanges.

10. A chain assembly according to claim 9, wherein said first and second flange portions are integral with one another and with said plate means.

11. A chain assembly according to claim 1, wherein said adjacent end edges of adjacent ones of said plate means engage one another between adjacent pairs of inner and outer link plates to preclude pivotal displacement of said adjacent pair of inner and outer link plates in just one of said opposite directions.

12. A chain assembly according to claim 11, wherein said plate means includes alternate first and second plate means, said first plate means including finger means extending in a common direction with respect to the direction between said opposite end edges.

13. A chain assembly according to claim 12, wherein said first plate means includes planar plate portions and each said finger means is spaced from and parallel to the corresponding planar plate portions and provides a recess therewith opening in said common direction.

14. A chain assembly according to claim 13, wherein said second plate means include means partially covering the recess in an adjacent one of said first plate means.

15. A chain assembly according to claim 14, wherein said first and second plate means are removably mounted on said mounting flanges.

16. A chain assembly according to claim 14, wherein each said finger means and each said means partially covering said recess has a width generally corresponding to the lateral spacing between said pairs of inner link plates.

17. A chain assembly according to claim 14, wherein said second plate means includes planar plate portions and said means partially covering said recess is projection means extending from said planar plate portions at the end edge of said second plate means adjacent said adjacent one of said first plate means.

18. A chain assembly according to claim 17, wherein each said finger means has an outer end in said common direction generally parallel to and overlying the corresponding end edge of said first plate means.

19. A chain assembly according to claim 18, wherein said first and second plate means are removably mounted on said mounting flanges.

20. A chain assembly according to claim 19, wherein each said finger means and projection means has a width generally corresponding to the lateral spacing between said pairs of inner link plates.

* * * * *